United States Patent
Zhu

(10) Patent No.: US 10,530,921 B2
(45) Date of Patent: Jan. 7, 2020

(54) METHOD FOR UNLOCKING TERMINAL SCREEN AND TERMINAL

(71) Applicant: Tencent Technology (Shenzhen) Company Limited, Shenzhen (CN)

(72) Inventor: Zhigang Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 703 days.

(21) Appl. No.: 15/153,208

(22) Filed: May 12, 2016

(65) Prior Publication Data

US 2016/0295007 A1   Oct. 6, 2016

Related U.S. Application Data

(63) Continuation of application No. PCT/CN2015/070171, filed on Jan. 6, 2015.

(30) Foreign Application Priority Data

Jan. 6, 2014   (CN) .......................... 2014 1 0005865

(51) Int. Cl.
*H04M 1/725* (2006.01)
*H04L 29/06* (2006.01)
*H04W 12/06* (2009.01)

(52) U.S. Cl.
CPC ...... *H04M 1/72577* (2013.01); *H04L 63/083* (2013.01); *H04L 63/20* (2013.01); *H04W 12/06* (2013.01)

(58) Field of Classification Search
CPC .. H04M 1/72577; H04L 63/083; H04L 63/20; H04L 9/3226; H04W 12/06; G06F 21/31; G06F 2221/2137

(Continued)

(56) References Cited

U.S. PATENT DOCUMENTS

2006/0053301 A1* 3/2006 Shin ..................... G06F 21/36
                                                      713/183

FOREIGN PATENT DOCUMENTS

CN       1851788 A     10/2006
CN     101833797 A      9/2010
(Continued)

OTHER PUBLICATIONS

International Search Report for PCT/CN2015/070171 filed on Jan. 6, 2015; dated Apr. 9, 2015.

*Primary Examiner* — Joel Ajayi
(74) *Attorney, Agent, or Firm* — Cantor Colburn LLP

(57) ABSTRACT

A method for unlocking a terminal screen and a terminal are disclosed. When it is detects that a user triggers an unlocking instruction for a terminal screen, a terminal generates and displays a random number; acquires a standard unlocking password through calculation according to an unlocking rule and the random number; receives an unlocking password input by a user and acquired through calculation according to the unlocking rule; identifies, according to the standard unlocking password, whether the unlocking password input by the user is correct; and when it is identified that the unlocking password input by the user is correct, unlocks the locked terminal screen. Compared with a manner of unlocking a terminal screen by using a fixed unlocking password in the prior art, embodiments of the present disclosure have a beneficial effect of unlocking a terminal screen by using a dynamic password, which improves security of a terminal.

9 Claims, 5 Drawing Sheets

(58) Field of Classification Search
USPC .......................................... 713/183; 455/411
See application file for complete search history.

(56) References Cited

FOREIGN PATENT DOCUMENTS

| CN | 101877636 A | 11/2010 |
| CN | 102316120 A | 1/2012 |
| CN | 103024142 A | 4/2013 |
| CN | 103530582 A | 1/2014 |
| CN | 103079000 B | 12/2014 |

* cited by examiner

METHOD FOR UNLOCKING TERMINAL SCREEN AND TERMINAL

CROSS-REFERENCE TO RELATED APPLICATIONS

This application is a continuation of International Patent Application No. PCT/CN2015/070171 filed on Jan. 6, 2015 which claims the priority benefit of Chinese Patent Application No. 201410005865.7, filed Jan. 6, 2014, where the contents of said applications are incorporated by reference herein in their entirety for all purposes.

TECHNICAL FIELD

The present disclosure relates to information security technologies, and in particular, to a method for unlocking a terminal screen and a terminal.

BACKGROUND

Currently, there are mainly two manners of inputting an unlocking password to a terminal screen, one of which is to input a fixed number password, such as iphone, and the other one is to input a gesture sliding trajectory on a nine grid, such as an android phone with a touch screen.

In the foregoing two unlocking manners, unlocking passwords input by a user are both fixed passwords, that is, a fixed combination of numbers or a fixed gesture sliding trajectory on a nine grid. If another person sees a process in which a user inputs an unlocking password or inputs an unlocking sliding trajectory, the unlocking password for a mobile phone is exposed, which therefore cannot ensure the security of private information in the mobile phone of the user or information such as other stored important data.

SUMMARY

An embodiment of the present disclosure discloses a method for unlocking a terminal screen, performed at the terminal screen having one or more processors and one or more memories for storing programs to be executed by the processors, including:

generating and displaying a random number when it is detected that a user triggers an unlocking instruction for the terminal screen;

acquiring a standard unlocking password through calculation according to an unlocking rule and the random number;

receiving an unlocking password input by the user;

identifying, according to the standard unlocking password, whether the unlocking password input by the user is correct; and unlocking the terminal screen which is locked, when it is identified that the unlocking password input by the user is correct.

An embodiment of the present disclosure further discloses a terminal, including:

a monitoring module, configured to generate and display a random number when it is detected that a user triggers an unlocking instruction for a terminal screen;

a calculation module, configured to acquire a standard unlocking password through calculation according to an unlocking rule and the random number;

a receiving module, configured to receive an unlocking password input by the user; and an unlocking module, configured to identify, according to the standard unlocking password, whether the unlocking password input by the user is correct; and unlock the terminal screen which is locked, when it is identified that the unlocking password input by the user is correct.

In the aforementioned embodiments of the present disclosure, when a terminal detects that a user triggers an unlocking instruction for a terminal screen, the terminal generates and displays a random number; acquires a standard unlocking password through calculation according to an unlocking rule and the random number; receives an unlocking password input by the user; identifies, according to the standard unlocking password, whether the unlocking password input by the user is correct; and when it is identified that the unlocking password input by the user is correct, unlocks the locked terminal screen. Compared with a manner of unlocking a terminal screen by using a fixed unlocking password in the prior art, an objective of unlocking a terminal screen by using a dynamic password is implemented in the embodiments of the present disclosure, which improves security of a terminal.

Implementation of objectives and functional features and advantages of the embodiments of the present disclosure are further described with reference to the embodiments and the accompanying drawings.

DESCRIPTION OF EMBODIMENTS

Technical solutions of the present disclosure are further described with reference to the accompanying drawings of the specification and specific embodiments. It should be understood that, specific embodiments described herein are merely used to explain the present disclosure instead of limiting the present disclosure.

Figure 1:
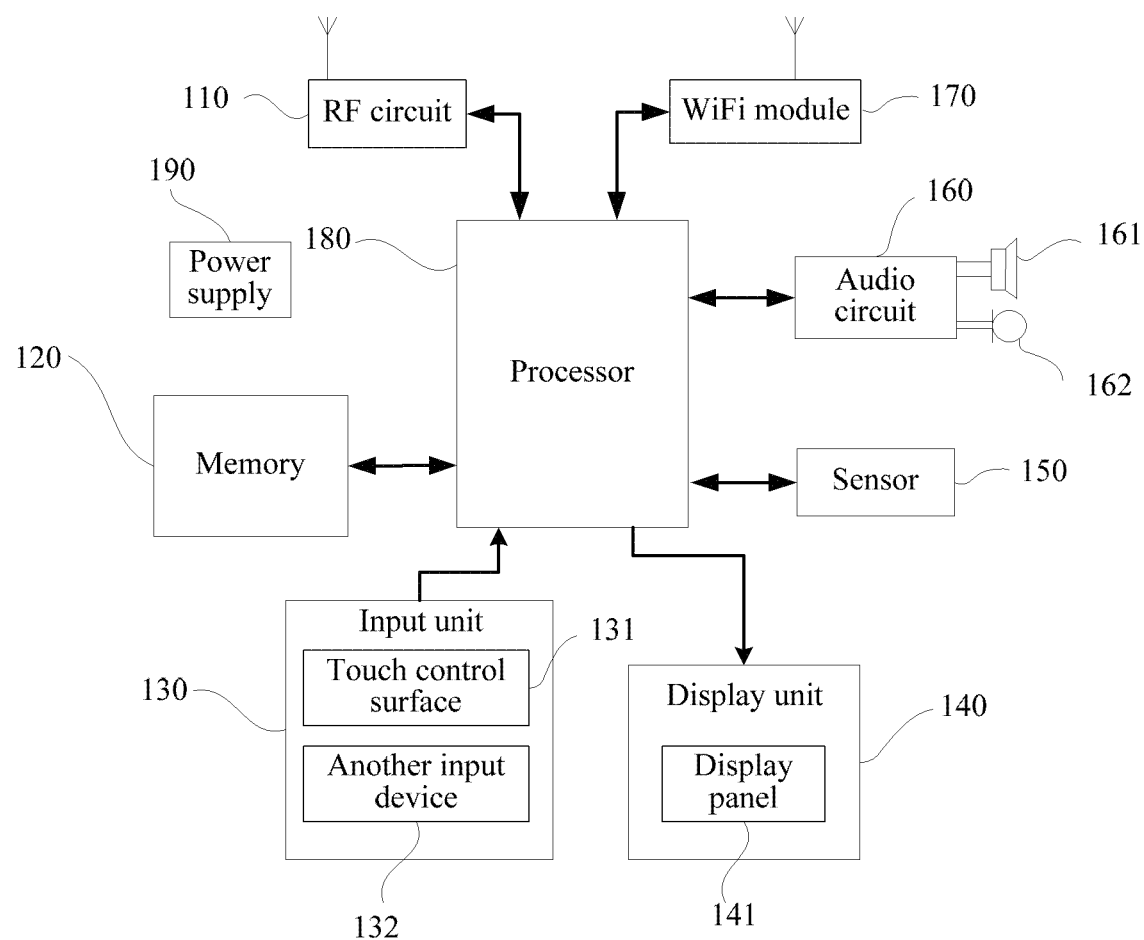
FIG. 1 is a schematic diagram of an operating environment of a method for unlocking a terminal screen according to the present disclosure.

Referring to FIG. 1, FIG. 1 is a schematic diagram of an operating environment of a method for unlocking a terminal screen according to the present disclosure, as one example, the method is performed at the terminal screen having one or more processors and one or more memories for storing programs to be executed by the processors. FIG. 1 is a schematic structural diagram of a terminal involved in an embodiment of the present disclosure, and the terminal may be used to perform the method for unlocking a terminal screen provided in the foregoing embodiment. Specifically:

The terminal may include components such as a radio frequency (RF) circuit 110, a memory 120 including one or more computer readable storage media, an input unit 130, a display unit 140, a sensor 150, an audio circuit 160, a wireless network such as a Wireless Fidelity (WiFi) module 170 shown in FIG. 1, a processor 180 including one or more processing cores, and a power supply 190. A person skilled in the prior art may understand that, the structure of the terminal shown in FIG. 1 does not constitute any limitation on the terminal, and may include components more or less than those shown in the figure, or a combination of some components, or different component layouts.

The RF circuit 110 may be used to receive and send information or a signal during a call, and in particular, after receiving downlink information of a base station, hand over the downlink information to one or more processors 180 for processing; and in addition, send related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LAN), and a duplexer. In addition, the RF circuit 110 may further communicate with a network and another device by using wireless communication. The wireless communication may use any communications standard or protocol, which includes, but is not limited to, a Global System for Mobile Communications (GSM), a General Packet Radio Service (GPRS), Code Division Multiple Access (CDMA), Wideband Code Division Multiple Access (WCDMA), Long Term Evolution (LTE), e-mail, a short messaging service (SMS), and the like.

The memory 120 may be configured to store a software program and a module, and the processor 180 runs the software program and the module stored in the memory 120 to implement various functional applications and data processing. The memory 120 may mainly include a program storage area and a data storage area. The program storage area can store an operating system, an application program required by at least one function (such as a voice playback function and an image playback function), and the like. The data storage area may store data (such as audio data and an address book) created according to use of the terminal. In addition, the memory 120 may include a high speed random access memory, and may also include a non-volatile memory, such as at least one magnetic disk storage device, a flash memory, or another volatile solid-state storage device. Accordingly, the memory 120 may further include a memory controller, so that the processor 180 and the input unit 130 access the memory 120.

The input unit 130 may be configured to receive input number or character information, and generate a keyboard, mouse, joystick, optical, or trackball signal input related to the user setting and function control. The input unit 130 may include a touch control surface 131 and another input device 132. The touch control surface 131 may also be referred to as a touch display screen or a touch panel, and may collect a touch operation of a user on or near the touch control surface (such as a screen unlocking operation on the touch control surface 131 or an operation near the touch control surface 131 that are performed by a user by using any suitable object or attachment, such as a finger or a stylus), and drive a corresponding connection apparatus by using a preset program. The touch control surface 131 may include two parts: a touch detection apparatus and a touch controller. The touch detection apparatus detects a touch gesture trajectory input by a user, detects a signal generated by a touch operation, and sends the signal to the touch controller. The touch controller receives touch information from the touch detection apparatus, converts the touch information into contact coordinates, sends the contact coordinates to the processor 180, receives a command sent by the processor 180, and executes the command. In addition, the touch control surface 131 may be implemented by using various types, such as a resistive type, a capacitive type, an infrared type, and a surface acoustic wave type. Besides the touch control surface 131, the input unit 130 may further include the another input device 132. The another input device 132 may include, but is not limited to, one or more of a physical keyboard, a functional key (such as a volume control key and a switch key), a trackball, a mouse, and a joystick.

The display unit 140 may be configured to display information input by a user or information provided to a user, and various graphical user interfaces of the terminal, where these graphical user interfaces may be formed by a graph, a text, an icon, a video, and any combination thereof. The display unit 140 may include a display panel 141. The display panel 141 may be configured in the form of a liquid crystal display (LCD), an organic light-emitting diode (OLED), or the like. Further, the touch control surface 131 may cover the display panel 141. After detecting a touch operation on or near the touch control surface 131, the touch control surface 131 transfers the touch operation to the processor 180, so as to determine a type of a touch event. Subsequently, the processor 180 provides corresponding visual output on the display panel 141 according to the type of the touch event. In FIG. 1, the touch control surface 131 and the display panel 141 are used as two separate parts to implement input and output functions; however, in some embodiments, the touch control surface 131 and the display panel 141 may be integrated to implement the input and output functions.

The terminal may further include at least one sensor 150, for example, an optical sensor, a motion sensor, and other sensors. The optical sensor may include an ambient light sensor and a proximity sensor, where the ambient light sensor may adjust the luminance of the display panel 141 according to brightness of the ambient light, and the proximity sensor may switch off the display panel 141 and/or backlight when the terminal is moved near an ear. As one type of the motion sensor, a gravity acceleration sensor may detect the magnitude of accelerations in various directions (which generally are triaxial), may detect the magnitude and direction of the gravity when the sensor is still, may be configured to identify an application of a mobile phone gesture (for example, switching between landscape and portrait modes, related games, and gesture calibration of a magnetometer), and a function related to vibration identification (such as a pedometer and a tap). Other sensors, for example, a gyroscope, a barometer, a hygrometer, a thermometer, and an infrared sensor, which may be configured in the terminal device 400 are not further described herein.

The audio circuit 160, a loudspeaker 161, and a microphone 162 may provide audio interfaces between the user and the terminal. The audio circuit 160 may transmit, to the loudspeaker 161, a received electric signal converted from received audio data. The loudspeaker 161 converts the electrical signal into a sound signal for output. On the other hand, the microphone 162 converts a collected sound signal into an electrical signal. The audio circuit 160 receives the electrical signal and converts the electrical signal into audio data, outputs the audio data to the processor 180 for processing. Next, the processor 180 sends the audio data to another terminal by using the RF circuit 110, or outputs the audio data to the memory 120 for further processing. The audio circuit 160 may further include an earplug jack, so as to provide communication between a peripheral earphone and the terminal.

The WiFi belongs to a short range wireless transmission technology. The terminal may help, by using a WiFi module 170, the user receive and send an e-mail, browse a webpage, access a streaming medium, and the like, and the WiFi provides the user with wireless broadband Internet access. Although FIG. 1 shows the WiFi module 170, it may be understood that, the WiFi module 170 is not an essential part of the terminal, and can be completely omitted as required without changing the nature of the present disclosure.

The processor 180 is a control center of the terminal, and connects various parts of a whole mobile phone by using various interfaces and circuits. By running or executing the software program and/or the module stored in the memory 120 and invoking data stored in the memory 120, the processor 180 performs various functions and data processing of the terminal, thereby performing overall monitoring on the mobile phone. The processor 180 may include one or more processing cores. The processor 180 may integrate an application processor and a modem. The application processor mainly processes an operating system, a user interface, an application program, and the like, and the modem mainly processes wireless communication. It may be understood that, the foregoing modem may also be not integrated into the processor 180.

The terminal further includes the power supply 190 (such as a battery) for supplying power to the components. The power supply may be logically connected to the processor 180 by using a power supply management system, thereby implementing functions such as charging, discharging, and power consumption management by using the power supply management system. The power supply 190 may further include any component, such as one or more direct current or alternate current power supplies, recharging systems, power supply fault detection circuits, power supply converters or inverters, and power supply state indicators.

Although not shown in the figure, the terminal may further include a camera, a Bluetooth module, and the like, which are not further described herein. In this embodiment, the display unit of the terminal is a touch screen display, and the terminal further includes a memory and one or more programs. The one or more programs are stored in the memory, and configured to be executed by one or more processors. The one or more programs contain operating instructions which can be used to perform the following embodiments corresponding to the method for unlocking a terminal screen in the embodiments of the present disclosure.

Figure 2:
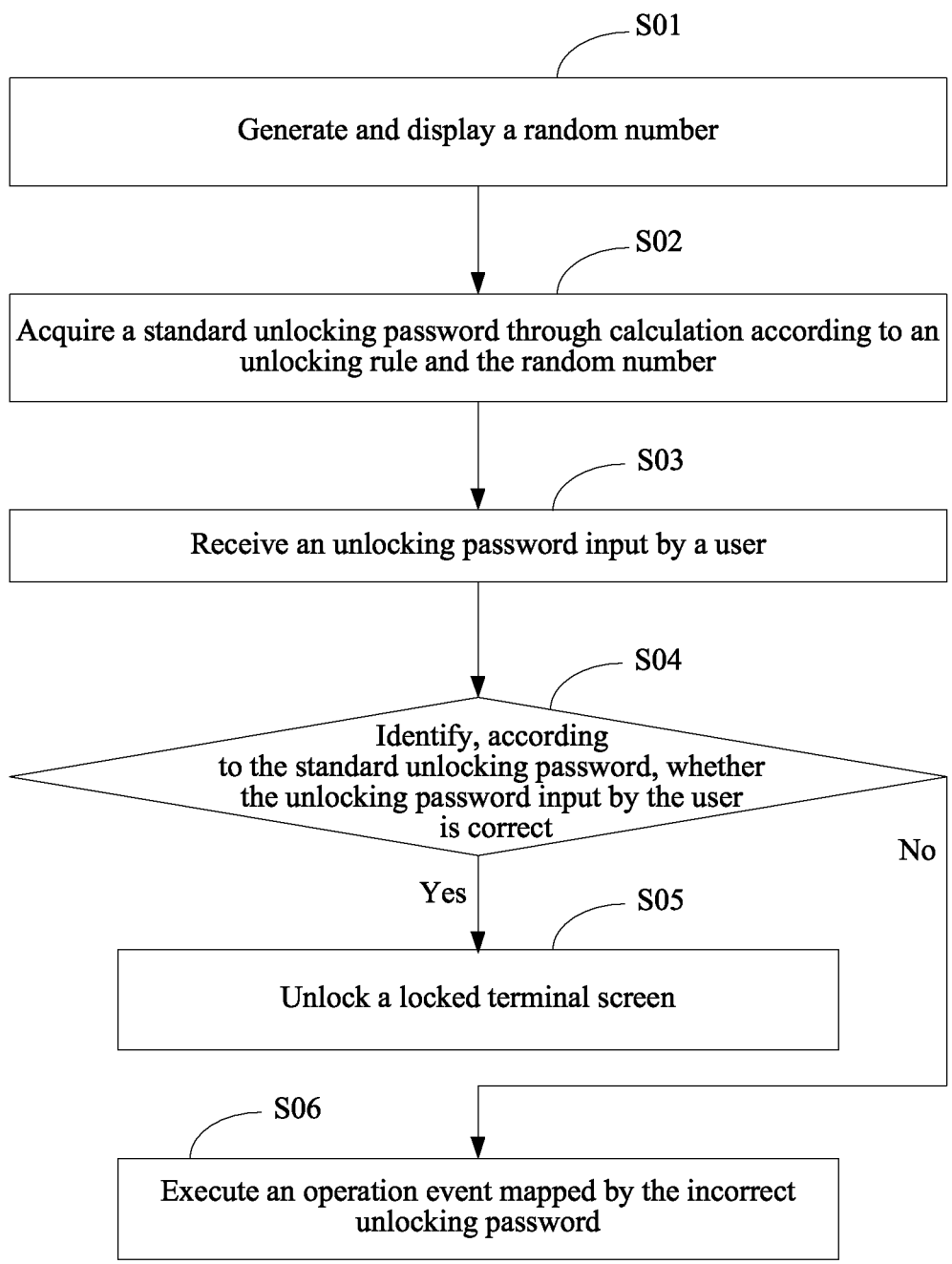
FIG. 2 is a schematic flowchart of a first embodiment of a method for unlocking a terminal screen according to the present disclosure.

FIG. 2 is a schematic flowchart of a first embodiment of a method for unlocking a terminal screen according to the present disclosure. As shown in FIG. 2, the method for unlocking a terminal screen according to the present disclosure includes:

Step S01: Generate and display a random number.

According to a current use situation of a terminal, the terminal in this embodiment of the present disclosure is a terminal having a function of activating a locked screen, and the terminal has activated a locked screen function (briefly referred to as "lock screen" hereinafter).

When it is detected an unlocking instruction, which is triggered by the user, for a terminal screen, the terminal generates a random number, and displays the generated random number for the user to view and acquire. In this embodiment of the present disclosure, the random number generated by the terminal is a random combination of ten Arabic numerals 0 to 9. In another embodiment of the present disclosure, for the convenience of data operation processing, the number of digits of the random number generated by the terminal is consistent with the number of digits of an unlocking password for the terminal screen. For example, the generated random number and the unlocking password both have 4 digits or 6 digits.

Figure 3:
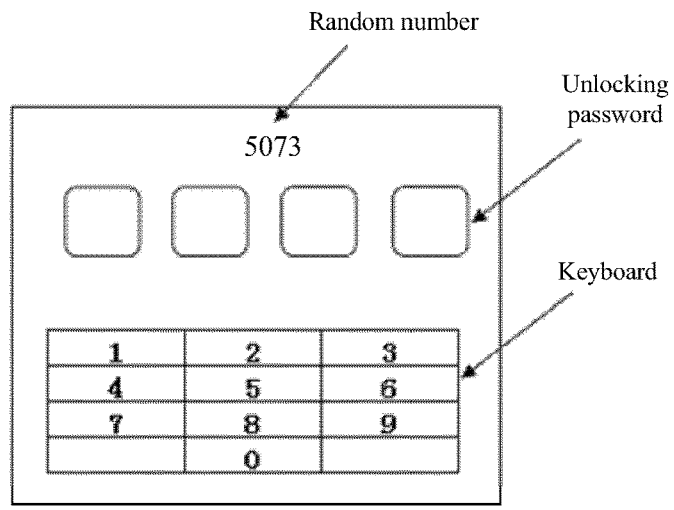
FIG. 3 is a schematic diagram of a screen of an embodiment of displaying a generated random number by a terminal in a method for unlocking a terminal screen according to the present disclosure.

FIG. 3 is a schematic diagram of a screen of an embodiment of displaying a generated random number by a terminal in a method for unlocking a terminal screen according to the present disclosure. As shown in FIG. 3, the terminal displays the generated random number on a display screen for the user to view. As shown in FIG. 3, the random number generated by the terminal is 5073, which is a 4-digit number, and correspondingly, an input box provided by the terminal for the user to input an unlocking password also has 4 digits. In another embodiment, the terminal randomly generates a combination of numbers according to a timestamp at which the user triggers the unlocking instruction for a terminal screen, that is, the random number. Because a timestamp at which the user triggers the unlocking instruction each time is different, a combination of numbers that is randomly generated by the terminal is also different.

In another embodiment, in order to improve information security, after generating a random number A, the terminal displays the generated random number in preset duration T1, and after the preset duration T1 is reached, the terminal cancels displaying of the random number A.

Step S02: Acquire a standard unlocking password through calculation according to an unlocking rule and the random number.

The terminal acquires the random number generated by the terminal and an unlocking rule on which the terminal agrees with the user in advance, that is, the terminal acquires the standard unlocking password through calculation according to the generated random number and the preset unlocking rule.

Step S03: Receive an unlocking password input by the user.

The user views the random number displayed on the terminal, acquires the unlocking password for the terminal through calculation according to the random number displayed on the terminal and the preset unlocking rule, and inputs, to an input box of the unlocking password displayed on the terminal, the unlocking password obtained through calculation. As shown in FIG. 3, the terminal receives the unlocking password input to the password input box by the user.

In this embodiment of the present disclosure, the unlocking password acquired by the user is uniquely determined according to the random number generated by the terminal and the preset unlocking rule. Because the random number is a combination of numbers that is randomly generated by the terminal, and the preset unlocking rule is also a calculation rule on which the user agrees with the terminal in advance, even if the random number is peeped by another person when the terminal displays the random number, the another person cannot know a correct unlocking password.

Step S04: Identify, according to the standard unlocking password, whether the unlocking password input by the user is correct, and if yes, perform step S05, or if not, perform step S06.

Step S05: Unlock the locked terminal screen.

Step S06: Execute an operation event mapped by the incorrect unlocking password.

After obtaining the standard unlocking password through calculation, the terminal receives the unlocking password input by the user, and compares the unlocking password input by the user with the standard unlocking password obtained through calculation. When the unlocking password input by the user is consistent with the standard unlocking password obtained by the terminal through calculation, the terminal identifies that the unlocking password input by the user is the correct unlocking password, and the terminal unlocks the locked screen for the user to use.

When the terminal identifies that the unlocking password input by the user is inconsistent with the standard unlocking password, the terminal identifies that the unlocking password input by the user is incorrect. When the terminal identifies that the unlocking password input by the user is incorrect, the terminal performs the operation event mapped by the incorrect unlocking password. For example, the terminal prompts the user to input the unlocking password again; or, the terminal continues to maintain a lock screen state, and does not perform any operation.

In another embodiment of the present disclosure, step S02 and step S03 are interchangeable in an execution order, that is, the terminal may obtain the standard unlocking password through calculation after receiving the unlocking password input by the user. Because during an actual use process of the terminal, it is possible that the terminal does not receive the unlocking password input by the user after monitoring that the user triggers the unlocking instruction for the terminal screen, or the terminal does not receive, in valid duration corresponding to this unlocking instruction monitored by the terminal, the unlocking password input by the user, the terminal does not need to calculate the standard unlocking password, which prevents the terminal from performing redundant computation, and reduces power consumption of the terminal.

In this embodiment of the present disclosure, when the terminal detects that a user triggers an unlocking instruction for a terminal screen, a terminal generates and displays a random number; acquires a standard unlocking password through calculation according to an unlocking rule and the random number; receives an unlocking password input by the user; identifies, according to the standard unlocking password, whether the unlocking password input by the user is correct; and when it is identified that the unlocking password input by the user is correct, unlocks the locked terminal screen. Compared with a manner of unlocking a terminal screen by using a fixed unlocking password in the prior art, an objective of unlocking a terminal screen by using a dynamic password is implemented in this embodiment of the present disclosure, which improves security of a terminal.

Figure 4:
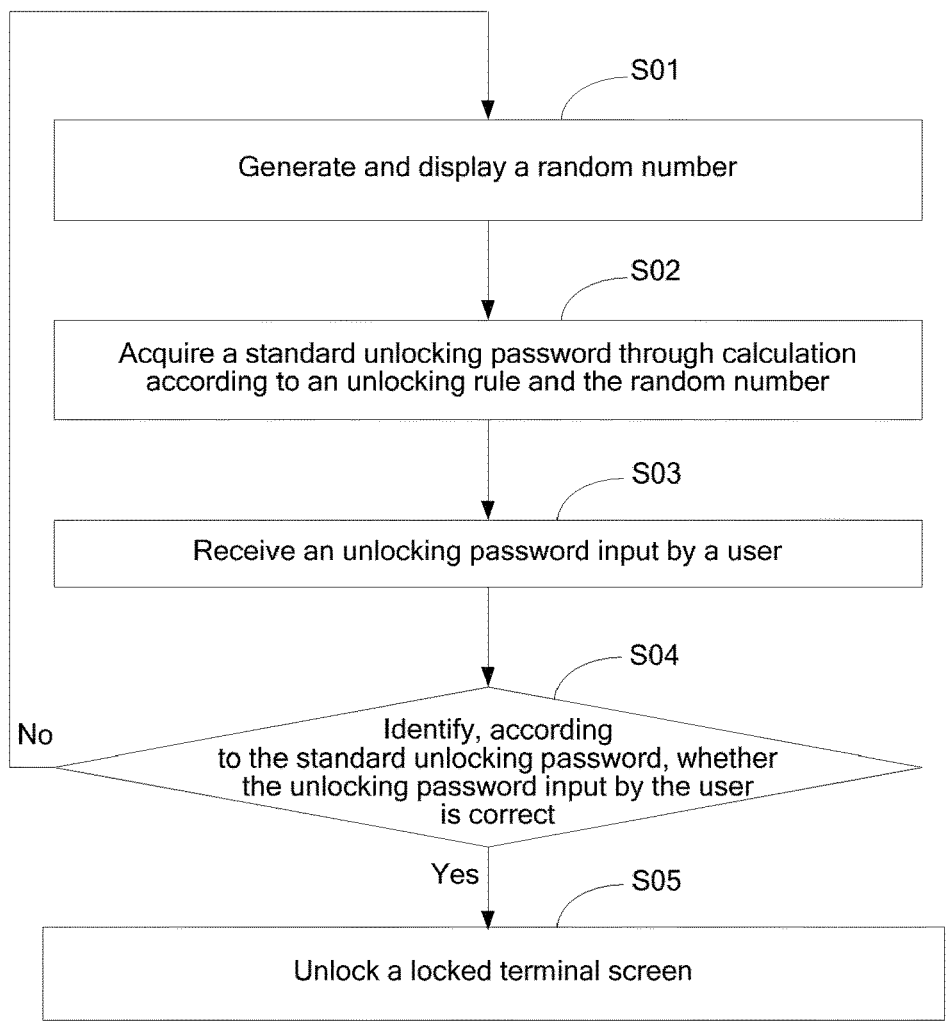
FIG. 4 is a schematic flowchart of a second embodiment of a method for unlocking a terminal screen according to the present disclosure.

FIG. 4 is a schematic flowchart of a second embodiment of a method for unlocking a terminal screen according to the present disclosure. A difference between this embodiment of the present disclosure and the embodiment in FIG. 2 is that, when it is identified that an unlocking password input by a user is incorrect, a terminal generates and displays another random number, which is different from the random number generated for identification of the incorrect unlocking password input by the user.

Based on the description of the embodiments in FIG. 2 and FIG. 3, as shown in FIG. 4, after "Step S04: Identify, according to the standard unlocking password, whether the unlocking password input by the user is correct", the method for unlocking a terminal screen according to the present disclosure further includes:

generating and displaying, by the terminal, another random number, that is, the terminal returns to perform the following step:

Step S01: Generate and display a random number.

When the terminal identifies that the unlocking password input by the user is incorrect, the terminal generates and displays another random number, that is, the terminal generates another random number B different from the random number A, and displays the generated random number B, and the terminal acquires, according to the random number B generated by the terminal and an unlocking rule on which the terminal agrees with the user in advance, that is, preset rule, a standard unlocking password corresponding to the random number B through calculation again. When receiving an unlocking password input by the user again, the terminal compares the standard unlocking password corresponding to the random number B with the unlocking password input by the user. After it is found through comparison that the unlocking password input by the user is consistent with the standard unlocking password that corresponds to the random number B and is obtained by the terminal through calculation, the terminal identifies that the unlocking password input by the user this time is the correct unlocking password, and the terminal unlocks the locked screen for the user to use. That is, operations corresponding to the method for unlocking a terminal screen in the embodiment in FIG. 2 are cyclically performed.

In another embodiment of the present disclosure, after the terminal generates and displays another random number, the method further includes:

determining, by the terminal, whether the number of times of generating a random number in preset duration T2 reaches a preset threshold; and after the preset threshold is reached, locking a terminal screen and forbidding an unlocking operation on the terminal screen in preset duration T3; where, for example, the terminal determines that the number of times that the terminal generates the random number in 5 minutes reaches 5, that is, after the terminal continuously generates a random number 5 times, the user still does not input the correct unlocking password; therefore, the terminal locks the screen, and forbids the user to perform any unlocking operation on the terminal screen in the next 3 minutes.

In this embodiment of the present disclosure, the preset duration T1, T2, and T3 and the preset threshold can all be set by the terminal according to an operation habit of the user in a historical time period, or may be set by the user. Specific values of the preset duration T1, T2, and T3 and the preset threshold are not limited in this embodiment of the present disclosure.

In this embodiment of the present disclosure, when the terminal identifies that the unlocking password input by the user for the first time is incorrect, the terminal generates another random number and allows the user to input an unlocking password several times, which improves intelligence in unlocking of the terminal.

Figure 5:
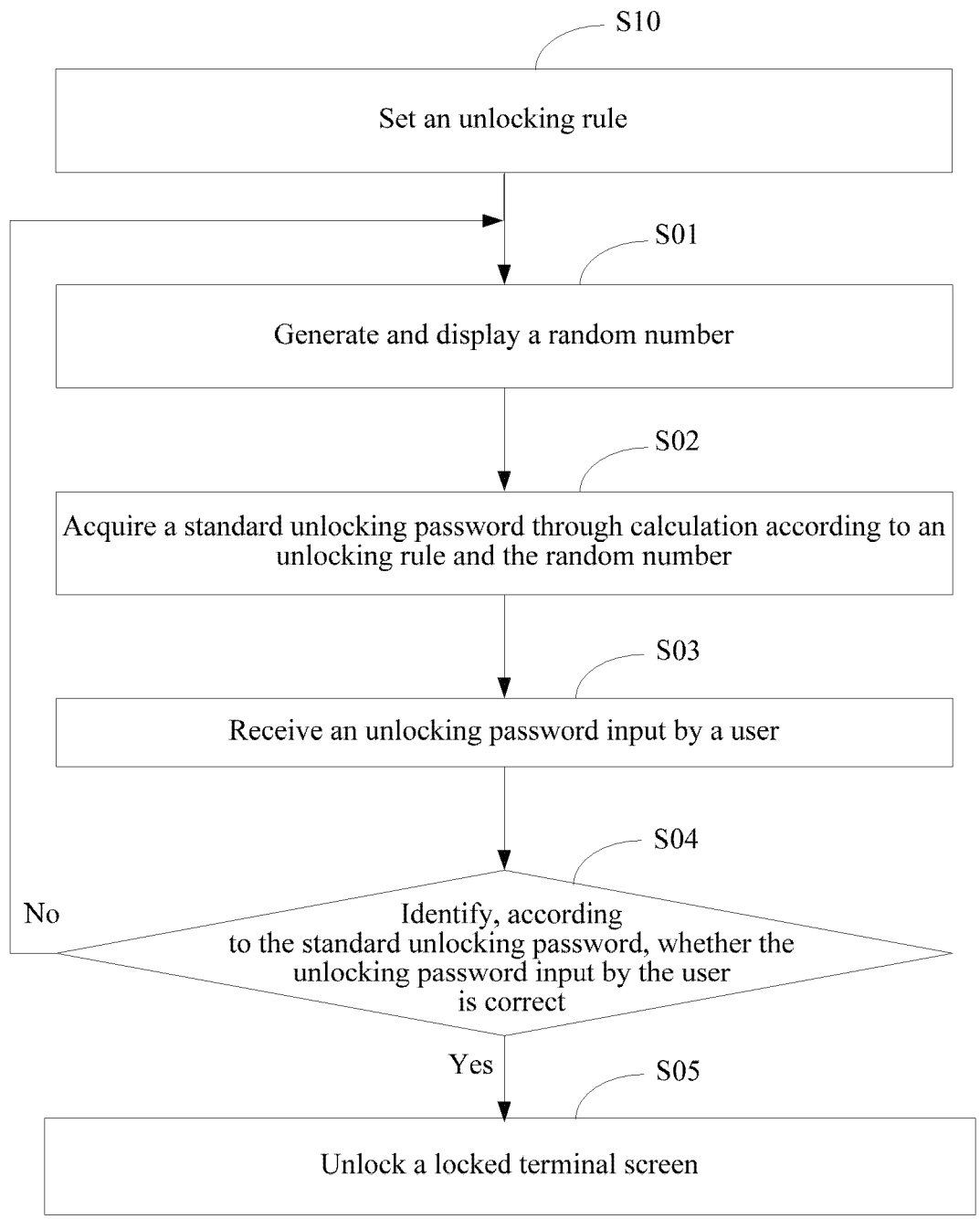
FIG. 5 is a schematic flowchart of a third embodiment of a method for unlocking a terminal screen according to the present disclosure.

FIG. 5 is a schematic flowchart of a third embodiment of a method for unlocking a terminal screen according to the present disclosure. A difference between this embodiment of the present disclosure and the embodiment in FIG. 2 or the embodiment in FIG. 4 is that, a terminal sets an unlocking rule before detecting that a user triggers an unlocking instruction for a terminal screen.

The embodiment in FIG. 5 is described based on the embodiment in FIG. 4. As shown in FIG. 5, before "Step S01: Generate and display a random number when it is detected that a user triggers an unlocking instruction for a terminal screen", the method for unlocking a terminal screen according to the present disclosure further includes:

Step S10: Set an unlocking rule.

Before detecting that the user triggers the unlocking instruction for the screen, the terminal sets a corresponding unlocking rule. The terminal may set the unlocking rule based on an operating instruction triggered by the user; and the terminal may also set, according to a default rule, for example, when the user does not set the unlocking rule and directly activates a screen unlocking function of the terminal, the terminal activates a default unlocking rule directly.

In another embodiment of the present disclosure, the terminal sets the unlocking rule includes: the terminal sets an unlocking base number, and sets a corresponding operation rule based on the set unlocking base number and by using the unlocking base number and the generated random number as parameters. For example, the sum of respective value of each digit of the generated random number and the corresponding value of each digit of the unlocking base number is used as the unlocking password, in which each value of the digits is the respective sum of the values. For another example, instead of summing the values, the absolute value of the difference value obtained by subtracting the respective value of each digit of the generated random number from the corresponding value of each digit of the unlocking base number is used as the unlocking password, in which each value of the digits is the respective subtraction of the values.

In this embodiment of the present disclosure, the unlocking base number and the operation rule may also be randomly set by the user. When the terminal sets the operation rule to be that the unlocking password is a number whose corresponding digits have the numbers being the numbers of last digits of respective sums of corresponding digits of the unlocking base number and the random number, if a sum of numbers of at least one corresponding digit in the unlocking base number set by the user and the random number generated by the terminal is greater than 9, that is, a two-digit number appears, a unit-digit number of the obtained two-digit number is used as the number corresponding to the digit. For example, when the unlocking password provided by the terminal is a 4-digit number, the unlocking base number set by the user is 1234, and the random number generated by the terminal is 8609, the terminal uses the unlocking base number and the random number as parameters, and acquires, through calculation according to the operation rule, a correct unlocking password being 9833.

In this embodiment of the present disclosure, in order to prevent the user from not setting an unlocking rule, a lock screen function of the terminal is directly activated, the unlocking password for the terminal is a 4-digit number by default, the unlocking base number is 1111 by default, and by default the operation rule for the unlocking base number and the random number that is generated by the terminal is that: numbers of corresponding digits of the unlocking base number and the random number are added to obtain sums for corresponding digits, so as to obtain a number whose corresponding digits are the respective sums, and the number is used as the unlocking password.

In this embodiment of the present disclosure, when the terminal sets an unlocking rule, the terminal further has a default unlocking rule when allowing a user to set a corresponding unlocking rule, which improves convenience for the user to acquire the unlocking rule.

Figure 6:
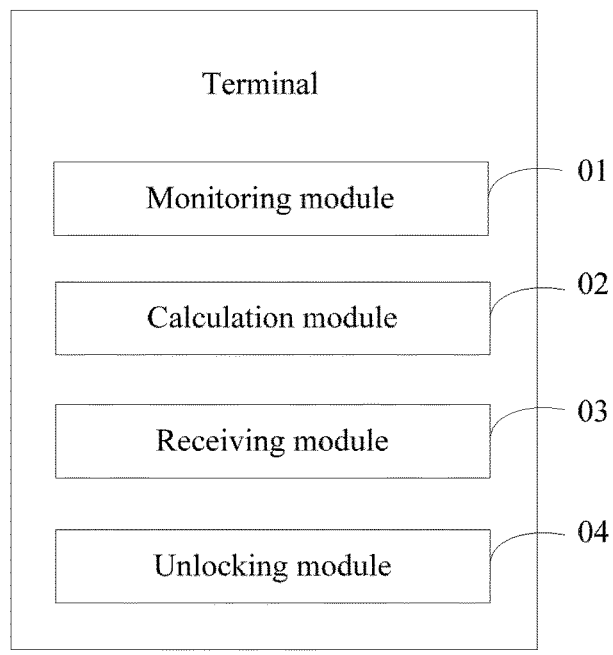
FIG. 6 is a schematic diagram of functional modules of a first embodiment of a terminal according to the present disclosure.

FIG. 6 is a schematic diagram of functional modules of a first embodiment of a terminal according to the present disclosure. As shown in FIG. 6, the terminal for performing a method for unlocking a terminal screen in this embodiment of the present disclosure includes: a monitoring module 01, a calculation module 02, a receiving module 03, and an unlocking module 04.

The monitoring module 01 is configured to generate and display a random number when it is detected that a user triggers an unlocking instruction for a terminal screen.

According to a current use situation of a terminal, the terminal in this embodiment of the present disclosure is a terminal having a function of activating a locked screen, and the terminal has activated a lock screen function.

When the monitoring module 01 detects the unlocking instruction, which is triggered by the user, for the terminal screen, the monitoring module 01 generates a random number, and displays the generated random number for the user to view and acquire. In this embodiment of the present disclosure, the random number generated by the monitoring module 01 is a random combination of ten Arabic numerals 0 to 9. In another embodiment of the present disclosure, for the convenience of data operation processing, the number of digits of the random numbers set and generated by the monitoring module 01 is consistent with the number of digits of an unlocking password for the terminal screen. For example, the random number generated by the monitoring module 01 and the unlocking password both have 4 digits or 6 digits.

As shown in FIG. 3, the monitoring module 01 displays the generated random number on a display screen for the user to view. As shown in FIG. 3, a random number generated by the monitoring module 01 is 5073, which is a 4-digit random number, and correspondingly, an input box provided by the terminal for the user to input an unlocking password also has 4 digits. In another embodiment, the monitoring module 01 randomly generates a combination of numbers according to a timestamp at which the user triggers an unlocking instruction for the terminal screen, that is, the random number. Because a timestamp at which the user triggers the unlocking instruction each time is different, a combination of numbers that is randomly generated by the monitoring module 01 is also different.

In another embodiment, in order to improve information security, after generating a random number A, the monitoring module 01 displays the generated random number in preset duration T1, and after the preset duration T1 is reached, the monitoring module 01 cancels displaying of the random number A.

The calculation module 02 is configured to acquire a standard unlocking password through calculation according to an unlocking rule and the random number.

The calculation module 02 acquires, through calculation according to the random number generated by the monitoring module 01 and the unlocking rule on which the terminal pre-agrees with the user, the standard unlocking password according to the generated random number and the preset unlocking rule.

The receiving module 03 is configured to receive the unlocking password that is input by the user and acquired through calculation according to the generated random number and the preset unlocking rule.

The user views the random number displayed on the terminal, acquires the unlocking password for the terminal through calculation according to the random number displayed on the terminal and the preset unlocking rule, and inputs, to an input box of the unlocking password displayed on the terminal, the unlocking password acquired through calculation. As shown in FIG. 3, the receiving module 03 receives the unlocking password input in the password box by the user.

In this embodiment of the present disclosure, the unlocking password acquired by the user is uniquely determined according to the random number generated by the terminal and the preset unlocking rule. Because the random number is a combination of numbers that is randomly generated by the monitoring module 01, and the preset unlocking rule is also a calculation rule on which the user pre-agrees with the terminal, even if a random number is peeped by another person when the monitoring module 01 displays the random number, the another person cannot know a correct unlocking password.

The unlocking module 04 is configured to identify whether the unlocking password input by the user is correct; and when it is identified that the unlocking password input by the user is correct, unlock the locked terminal screen.

After the calculation module 02 obtains the standard unlocking password through calculation, the receiving module 03 receives the unlocking password input by the user, the unlocking module 04 compares the unlocking password input by the user with the standard unlocking password obtained by the calculation module 02 through calculation, when the unlocking password input by the user is consistent with the standard unlocking password obtained by the terminal through calculation, the unlocking module 04 identifies that the unlocking password input by the user is the correct unlocking password, and the unlocking module 04 unlocks the locked screen for the user to use.

When the unlocking module 04 identifies that the unlocking password input by the user is inconsistent with the standard unlocking password, the unlocking module 04 identifies that the unlocking password input by the user is incorrect. When the unlocking module 04 identifies that the unlocking password input by the user is incorrect, the terminal performs an operation mapped by the event an incorrect unlocking password, for example, the terminal prompts the user to input the unlocking password again; or, the terminal continues to maintain a lock screen state, and does not perform any operation.

In another embodiment of the present disclosure, the calculation module 02 acquires the standard unlocking password through calculation, or the acquisition may be performed after the receiving module 03 receives the unlocking password input by the user. Because in a process of actual use of the terminal, it is possible that after the monitoring module 01 monitors that the user triggers the unlocking instruction for the terminal screen, the receiving module 03 does not receive the unlocking password input by the user, or, the monitoring module 01 monitors that the receiving module 03 does not receive, in valid duration corresponding to this unlocking instruction, the unlocking password input by the user, the calculation module 02 does not need to calculate the standard unlocking password, which prevents the terminal from performing redundant operation, and reduces power consumption of the terminal.

In this embodiment of the present disclosure, when the terminal detects that a user triggers an unlocking instruction for a terminal screen, the terminal generates and displays a random number; acquires a standard unlocking password through calculation according to an unlocking rule and the random number; receives an unlocking password input by the user; identifies, according to the standard unlocking password, whether the unlocking password input by the user is correct; and when it is identified that the unlocking password input by the user is correct, unlocks the locked terminal screen. Compared with a manner of unlocking a terminal screen by using a fixed unlocking password in the prior art, an objective of unlocking a terminal screen by using a dynamic password is implemented in this embodiment of the present disclosure, which improves security of a terminal.

Referring to FIG. 6 continuously, a difference between this embodiment and above embodiment is that, when a terminal identifies that an unlocking password input by a user is incorrect, the terminal generates and displays another random number.

Based on the specific description of above embodiment, as shown in FIG. 6, when an unlocking module 04 identifies that the unlocking password input by the user is incorrect, a monitoring module 01 generates and displays another random number, that is, a monitoring module 01 generates another random number B different from the random number A, and displays the generated random number B. Moreover, a calculation module 02 acquires, through calculation according to the random number B generated by the monitoring module 01 and an unlocking rule on which the terminal pre-agrees with the user, a standard unlocking password corresponding to the random number B again. After a receiving module 03 receives an unlocking password input by the user again, the unlocking module 04 compares the standard unlocking password that corresponds to the random number B and obtained by the calculation module 02 through calculation with the unlocking password input by the user, and after the unlocking password input by the user is consistent with the standard unlocking password that corresponds to the random number B and obtained by the calculation module 02 through calculation, the unlocking module 04 identifies that the unlocking password input by the user this time is the correct unlocking password, and the unlocking module 04 unlocks a locked screen for the user to use. Various functional modules of the terminal cooperate with each other to cyclically perform operations corresponding to a method for unlocking a terminal screen.

In another embodiment of the present disclosure, after the monitoring module 01 generates and displays another random number, the monitoring module 01 determines whether the number of times of generating a random number in preset duration T2 reaches a preset threshold; and after the preset threshold is reached, the monitoring module 01 locks a terminal screen and forbids an unlocking operation on the terminal screen in preset duration T3; where, for example, the monitoring module 01 determines that the number of times that the monitoring module 01 generates the random number in 5 minutes reaches 5, that is, after the monitoring module 01 continuously generates the random number 5 times, the user still does not input the correct unlocking password; therefore, the monitoring module 01 locks the screen, and forbids the user to perform any unlocking operation on the terminal screen in the next 3 minutes.

In this embodiment of the present disclosure, the preset duration T1, T2, and T3 and the preset threshold can all be set by the terminal according to an operation habit of the user in a historical time period, or may be set by the user. Specific values of the preset duration T1, T2, and T3 and the preset threshold are not limited in this embodiment of the present disclosure.

In this embodiment of the present disclosure, when the terminal identifies that an unlocking password input by the user for the first time is incorrect, the terminal generates another random number and allows the user to input an unlocking password several times, which improves intelligence for the terminal to unlock.

Figure 7:
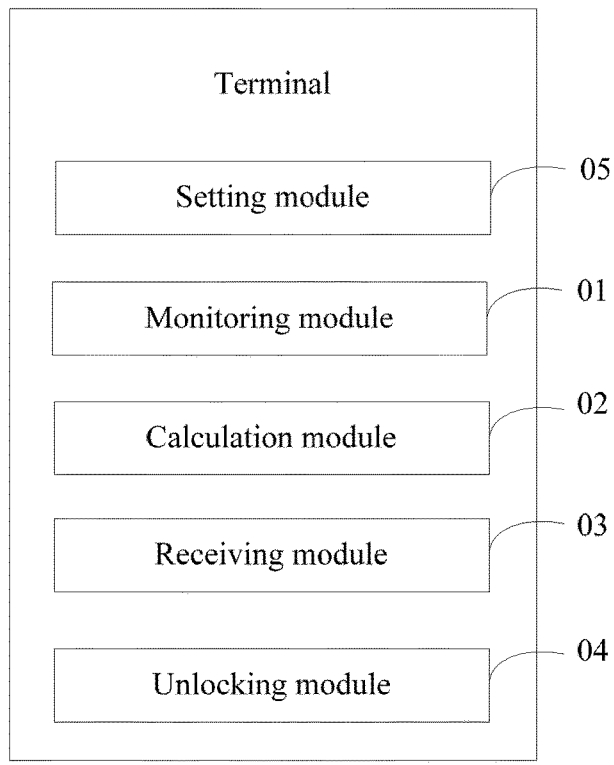
FIG. 7 is a schematic diagram of functional modules of a second embodiment of a terminal according to the present disclosure.

FIG. 7 is a schematic diagram of functional modules of a second embodiment of a terminal according to the present disclosure. A difference between this embodiment of the present disclosure and embodiments based on FIG. 6 is that, a terminal sets an unlocking rule before detecting that a user triggers an unlocking instruction for a terminal screen.

As shown in FIG. 7, the terminal for performing a method for unlocking a terminal screen according to this embodiment of the present disclosure further includes:

a setting module 05, configured to set the unlocking rule.

Before a monitoring module 01 detects that the user triggers the unlocking instruction for the screen, the setting module 05 sets a corresponding unlocking rule. The setting module 05 may set the unlocking rule based on an operating instruction triggered by the user; and the setting module 05 may also set, according to a default rule, for example, when the user does not set the unlocking rule and directly activates a screen unlocking function of the terminal, the setting module 05 activates a default unlocking rule directly.

In another embodiment of the present disclosure, the setting module 05 sets the unlocking rule includes: the setting module 05 sets an unlocking base number first, and sets a corresponding operation rule based on the set unlocking base number and by using the unlocking base number and a generated random number as parameters.

In this embodiment of the present disclosure, the unlocking base number and the operation rule may also be randomly set by the user. When the setting module 05 sets the operation rule to be that the unlocking password is a number whose corresponding digits have the numbers being the numbers of last digits of respective sums of corresponding digits of the unlocking base number and the random number, if a sum of numbers of at least one corresponding digit in the unlocking base number set by the user and the random number generated by the terminal is greater than 9, that is, a two-digit number appears, the setting module 05 uses a unit-digit number of the obtained two-digit number as the number corresponding to the digit. For example, when the unlocking password provided by the terminal is a 4-digit number, the unlocking base number set by the user is 1234, and the random number generated by the monitoring module 01 is 8609, the setting module 05 uses the unlocking base number and the random number as parameters, and acquires, through calculation according to the operation rule, a correct unlocking password being 9833.

In this embodiment of the present disclosure, in order to prevent the user from not setting an unlocking rule, a lock screen function of the terminal is directly activated, the setting module 05 sets that the unlocking password is a 4-digit number by default, the unlocking base number is 1111 by default, and the default operation rule for the unlocking base number and the random number that is generated by the terminal is that: numbers of corresponding digits of the unlocking base number and the random number are added to obtain sums for corresponding digits, so as to obtain a number whose corresponding digits are the respective sums, and the number is used as the unlocking password.

In this embodiment of the present disclosure, when the terminal sets an unlocking rule, the terminal further has a default unlocking rule when allowing a user to set a corresponding unlocking rule, which improves convenience for the user to acquire the unlocking rule.

It should be noted that the terms "include", "comprise", and any variants thereof are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. Unless otherwise specified, an element limited by "include a/an . . . " does not exclude other same elements existing in the process, the method, the object, or the device that includes the element.

The sequence numbers of the foregoing embodiments of the present disclosure are merely for the convenience of description, and do not imply the preference among the embodiments.

The above descriptions are merely preferred embodiments of the present disclosure, but not intended to limit the patent scope of the present disclosure. Any equivalent structure or equivalent process change that is made according to the specification of the present disclosure and content of the accompanying drawings and is directly and indirectly used in other related technical fields should fall within the patent protection scope of the present disclosure in a similar way.

The invention claimed is:

1. A method for unlocking a mobile terminal screen, performed at the terminal screen having one or more processors and one or more memories for storing programs to be executed by the processors, the method comprising:
    setting an unlocking rule, wherein the setting the unlocking rule comprises: setting an unlocking base number; and using a sum of a generated random number and the unlocking base number as a unlocking password;
    after setting the unlocking rule, generating and displaying a random number when it is detected that a user triggers an unlocking instruction for the terminal screen;
    acquiring a standard unlocking password through calculation according to the unlocking rule and the random number;
    receiving an unlocking password input by the user;
    identifying, according to the standard unlocking password, whether the unlocking password input by the user is correct; and
    unlocking the terminal screen which is locked, when it is identified that the unlocking password input by the user is correct.

2. The method according to claim 1, after the identifying whether the unlocking password input by the user is correct, further comprising:
    generating and displaying another random number, when it is identified that the unlocking password input by the user is incorrect.

3. The method according to claim 2, after the generating and displaying another random number, further comprising:
    determining whether the number of times of generating a random number in first preset duration reaches a preset threshold; and
    after the preset threshold is reached, locking the terminal screen and forbidding an unlocking operation on the terminal screen in second preset duration.

4. The method according to claim 1, wherein the acquiring a standard unlocking password through calculation according to an unlocking rule and the random number and the receiving an unlocking password input by the user are interchangeable in an execution order.

5. A terminal, comprising:
    one or more processors;
    memory; and
    one or more modules stored in the memory and to be executed by the one or more processors, the one or more modules comprising:

a monitoring module, configured to generate and display a random number when it is detected that a user triggers an unlocking instruction for a terminal screen;

a calculation module, configured to acquire a standard unlocking password through calculation according to an unlocking rule and the random number;

a receiving module, configured to receive an unlocking password input by the user; and an unlocking module, configured to identify, according to the standard unlocking password, whether the unlocking password input by the user is correct; and unlock the terminal screen which is locked, when it is identified that the unlocking password input by the user is correct;

wherein the terminal further comprises: a setting module, configured to set the unlocking rule before the generating and displaying a random number when it is detected that a user triggers an unlocking instruction for a terminal screen;

wherein the setting module is further configured to: set an unlocking base number; and use a sum of the generated random number and the unlocking base number as the unlocking password.

6. The terminal according to claim 5, wherein the monitoring module is further configured to generate and display another random number, when the unlocking module identifies that the unlocking password input by the user is incorrect.

7. The terminal according to claim 6, wherein the monitoring module is further configured to:

determine whether the number of times of generating a random number in first preset duration reaches a preset threshold; and after the preset threshold is reached, lock the terminal screen and forbid an unlocking operation on the terminal screen in second preset duration.

8. The method according to claim 1, wherein the generating and displaying a random number comprises:

after a random number is generated, displaying the random number in third preset duration, and after the third preset duration is reached, canceling displaying of the random number.

9. The terminal according to claim 5, wherein the monitoring module is further configured to:

after a random number is generated, display the random number in third preset duration, and after the third preset duration is reached, cancel displaying of the random number.

* * * * *